United States Patent [19]

Margen et al.

[11] 4,073,045
[45] Feb. 14, 1978

[54] CONVECTOR FOR HEATING ROOMS

[75] Inventors: Peter Heinrich Erwin Margen; Harry Evert Grimstedt; Jan Anders Bosaeus, all of Nykoping, Sweden

[73] Assignee: Aktiebolaget Atomenergi, Stockholm, Sweden

[21] Appl. No.: 571,846

[22] Filed: Apr. 25, 1975

Related U.S. Application Data

[62] Division of Ser. No. 433,003, Jan. 14, 1974, abandoned.

[51] Int. Cl.² .............................................. B23P 15/26
[52] U.S. Cl. ................................. 29/157.3 C; 165/172
[58] Field of Search .................... 29/157.3 C; 165/172

[56]         References Cited
           U.S. PATENT DOCUMENTS 1,634,812   7/1927   Whitehead ........................... 165/129
1,901,090   3/1933   Eule et al. .......................... 165/172 X
1,993,171   3/1935   Hyde ................................ 29/157.3 C
2,056,862   10/1936  Markley, Jr. ........................ 165/172 X
2,657,020   10/1953  Hoffmeister ........................... 165/172
3,277,959   10/1966  Withers ............................. 165/180 X Primary Examiner—C.W. Lanham
Assistant Examiner—V. Rising
Attorney, Agent, or Firm—Toren, McGeady and Stanger

[57]               ABSTRACT

There is provided a convector for heating rooms and a method for manufacturing same. This convector comprises a plastic tube wound to form a flat coil. The plastic used for the tube is preferably a cross-linked plastic, such as cross-linked polyethylene. Some of the coil-turns may be displaced inwards or outwards from the basic shape of the tube coil, in order to improve the convection.

9 Claims, 20 Drawing Figures

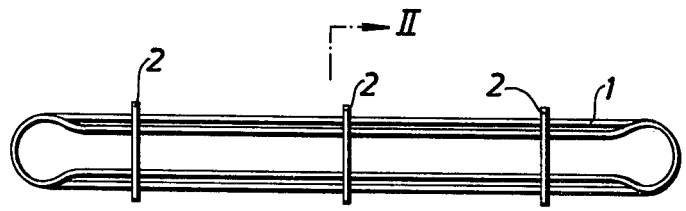
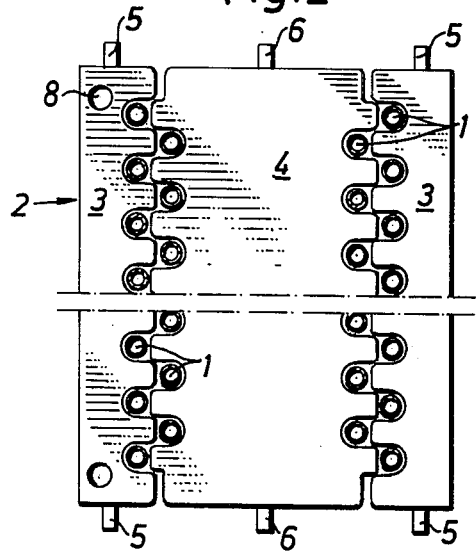
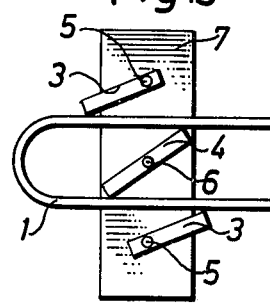
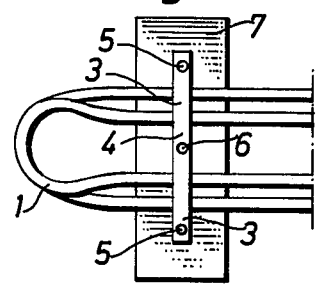
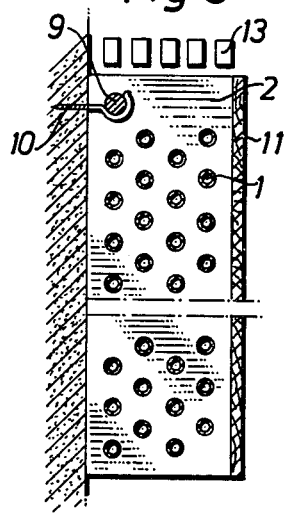
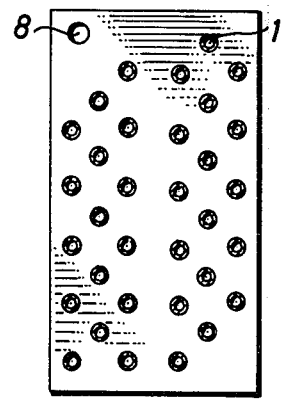

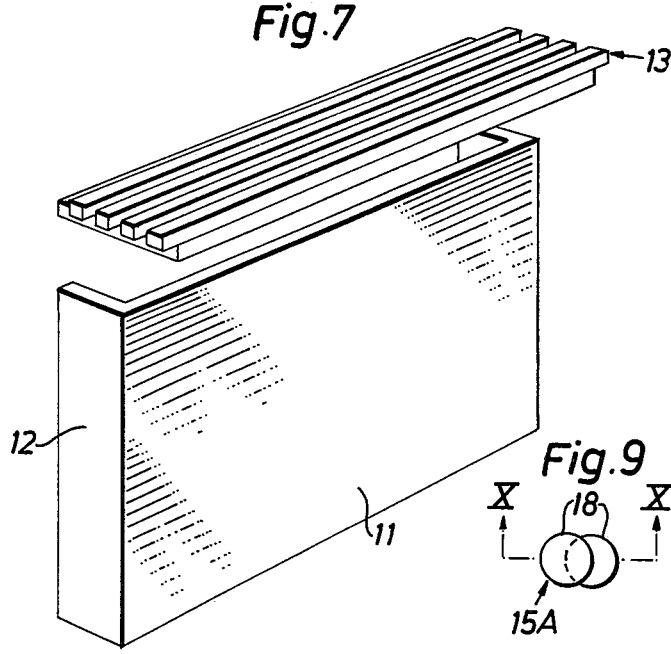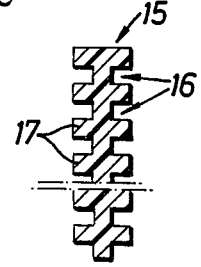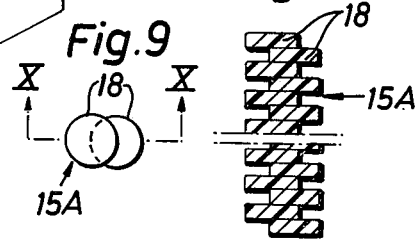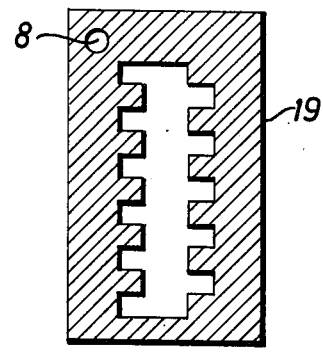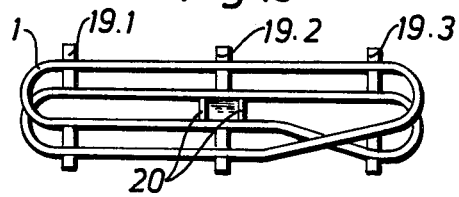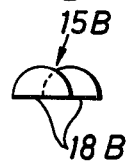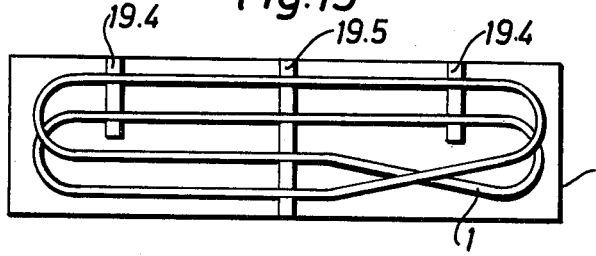

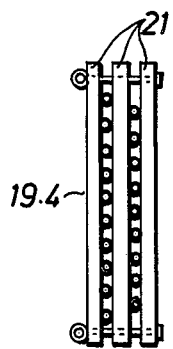
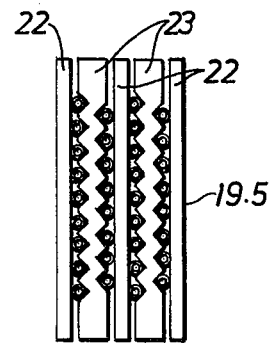
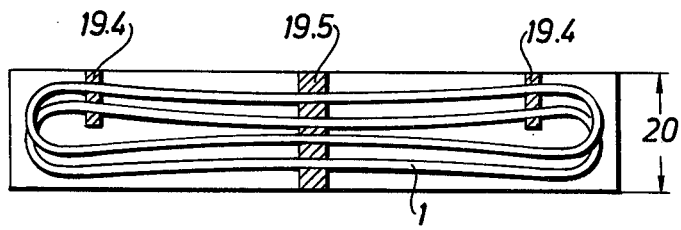
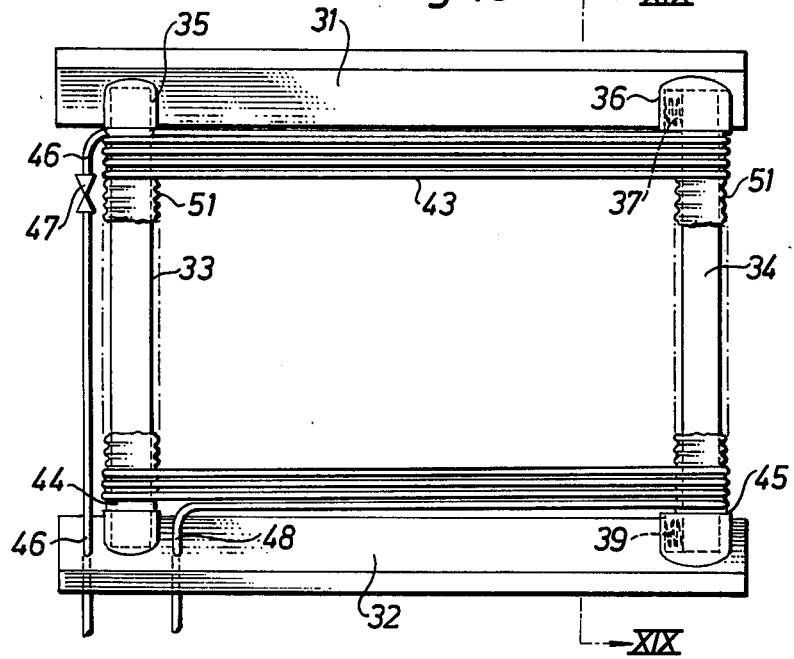
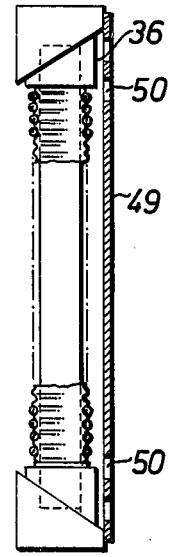

CONVECTOR FOR HEATING ROOMS

This is a division of application Ser. No. 433,033 filed on Jan. 14, 1974, now abandoned.

The invention relates to a convector for heating rooms. One object of the invention is to produce a convector which is simpler and less expensive to manufacture than conventional convectors of cast iron or sheet metal. A particular object of the invention is to produce a convector in which the heat-transmission surface consists of a cheap plastic tube.

The convector according to the invention as well as a method for manufacturing the same are defined in the accompanying claims.

The convector comprises a tube wound to form a flat coil, and possibly also temples arranged to maintain predetermined spacing of the coil turns, at least some parts of some coil turns preferably being displaced inwards towards the centre of the coil from the basic (flat cylindrical) shape of the tube coil, in order to increase the turbulence as the air flows through and past the convector, thus improving the convection.

The tube is wound around two parallel uprights to form a flat coil. The surface of the uprights is preferably rounded to a radius corresponding to the desired radius of curvature of the tube. If the convector coil is to be made of cross-linked polyethylene plastic, the tube should be coiled while it is still warm from the cross-linking process, directly after the manufacturing process.

The tubes may be smooth or corrugated. The coil turns may lie close together. Adjacent coil turns may be attached to each other. for example by glueing if the tube material permits glueing.

However, it is preferred for the coil turns to be somewhat spaced from each other. The tube surface of a convector of a certain size will then be slightly less than if the coils are close together, but on the other hand, the surfaces of the tubes facing each other will be more efficiently cooled.

The entire surface of the tube is freely exposed to the surrounding air (except for a small section of the uprights), as compared with certain known constructions where a metal tube is welded or pressed against a metal sheet constituting the primary heat-emitting surface. When using plastic tubes having low heat-conducting ability, it is important that the entire surface of the tube is cooled directly by the air.

The tube may be a metal tube but it is preferred to use plastic, such as cross-linked polyethylene, for the tube. It has been found that plastic tubes for this purpose can be given such thin walls, that the passage of heat through them is satisfactory. A tube of cross-linked polyethylene having an external diameter of 12 mm can be made having a wall thickness of 1 mm and will then stand a pressure of 5 atm overpressure at a temperature of 80° C. If a tube of this type is wound to form a radiator having a length of 1 m and a height of 0.6 m and the gap between adjacent coil turns is 4 mm and the radius of the uprights 30 mm, 75 m of tubing will be necessary for the radiator. The tube surface will be 2.3 m² and the thermal efficiency will be about 1.2 kW if the temperature of the water entering is 80° C and of the water leaving 60° C. The speed of the water passing through will then be about 0.18 m/sec.

The tube may alternatively be made of rubber, preferably reinforced rubber.

Alternatively, the radiator or convector according to the invention may comprise a frame and a tube wound onto the frame in the form of a flat coil. When the convector has been fitted, the coil should run horizontally. Due to a chimney effect the heated air can then rise without obstruction both inside the flat coil and outside it.

The frame may consist of a rectangular frame onto which the tube is wound around two parallel uprights. These uprights preferably have a surface rounded to a radius corresponding to the desired radius of curvature of the tube. The uprights may consist of steel tubes, for example, which are held together by cross-pieces of wood or plastic.

If the coil turns are slightly separated they can suitably be secured by arranging grooves on the surface of the uprights around which the tube is wound. Alternatively, a corrugated strip, for example of aluminum, may be arranged on each upright.

When the tube is subjected to temperature variations, it will vary in length. In order to keep the tube coils taut between the uprights, therefore, it is advisable for one of the uprights, possibly both, to be pressed outwards by one or more springs.

In order to produce a convector of the first-mentioned type, the tube of cross-linked polyethylene is wound into a flat coil while it is still hot. This warm or cooled coil may then be placed in a device which comprises a jig and combshaped element being pivotably arranged in said jig. These elements are intended to bring about a displacement of certain long sides of the coil. These comb elements are arranged to cooperate with each other when pivoted so that their teeth and tooth gaps fit into each other leaving openings for the tube and so that they displace certain of the long sides of the tube from or towards each other.

The comb elements can afterwards be secured to each other to form temples giving stiffness to the coil. The temples are also used for mounting the convector, the temples being secured to a wall, for example. A suitable method of mounting the convector is to arrange an aperture in each temple and pass a rod through these apertures, the rod then being hung on hooks secured in the wall.

The temples also permit the tube to move freely through the temple hollows as its length alters due to temperature fluctuations.

The invention will be described more fully in the following with reference to the accompanying drawings.

FIG. 1 shows a horizontal view of one embodiment of a convector according to the invention.

FIG. 2 shows a temple included in the convector.

FIGS. 3 and 4 show a means for shaping the convector.

FIGS. 5 and 6 show cross-sections of preferred embodiments of the convector and FIG. 7 shows the exterior of a convector according to the invention. FIGS. 8 – 10 show examples of uprights for the coil.

FIG. 11 shows the tube configuration after winding onto uprights according to FIGS. 9 and 10.

FIG. 12 shows a guide temple for the convector coil according to FIG. 11.

FIG. 13 shows a convector manufactured with the help of uprights according to FIG. 10 and temples according to FIG. 12.

FIG. 14 shows an alternative embodiment of the upright according to FIGS. 9 and 10.

FIGS. 15 – 18 show an alternative construction of the convector according to the invention.

FIG. 19 shows an alternative embodiment of the convector according to the invention.

FIG. 20 shows a section along the line XIX—XIX in FIG. 19.

The convector according to FIGS. 1 and 2 comprises a tube 1 wound to a flat coil, mounted in two temples 2, each comprising two single comb elements 3 and one double comb element 4. The comb elements 3, 4 are provided with bearing pins 5, 6 to be placed in a jig (FIG. 3). The teeth and tooth gaps of the combs 3, 4 are arranged to engage each other leaving openings for the tube 1.

FIGS. 3 and 4 show the tube 1 wound to form a straight coil which is placed over the lower part 6 of a jig which controls the pivoting of the comb elements 3, 4. The comb element 4 is placed inside the coil whereas the elements 3 are placed outside the coil, the bearing points being in alignment.

Starting from the position in FIG. 3 the comb elements 3, 4 are turned so that they all lie in the same plane, thus displacing the long sides of the tube coil so that they are spread over the thickness of the convector. When the comb elements 3, 4, which may be made of thin sheet iron for example, are placed in the position shown in FIG. 4 (corresponding to FIG. 2), they are secured to each other by means of glueing, for example, or by folding over flaps.

The tube coil is now secured in the three temples 2 which, as shown in FIGS. 2 and 6, have an opening 8 into which a mounting rod 9 is fitted. This rod 9 can then be hung on wall hooks 10 for simple mounting of the convector on a wall. The convector is preferably covered at least on the front and sides by sheets 11, 12 of fibreboard, for example. Together with the temples 2 and sheets 11, 12, the wall behind them forms channels through which the air rises while being heated.

FIG. 7 shows in perspective a convector covered by sheets 11, 12, on which a window-sill 13 consisting of ribs can be fitted.

FIG. 6 shows an alternative design for the tube coil 1 in which the long sides of the tube are arranged in three positions on each side.

FIG. 8 shows a section through an upright 15, symmetrical when rotated, which has narrower sections 16 and wider sections 17.

If two such uprights are used the tube can be placed in adjacent narrow sections 16 when winding in one direction and when these are filled, the tube can be placed on the wider sections 17 when winding in the other direction. The ends of the tube can therefore be arranged beside each other and the long sides of the coil will already be displaced with respect to each other during the winding process.

The narrow sections 16 and wide sections 17 consist of circular or semicircular elements (FIG. 8) which may be separate and held together during the winding process axially by a central bolt and nut, for example, so that after winding the uprights can easily be removed.

FIGS. 9, 10 and 14 show an alternative embodiment of uprights 15A and 15B corresponding to the uprights according to FIGS. 8 and, the sheet elements 18, 18B being displaced with respect to each other. These uprights 15A, 15B may also consist of separate elements connected axially.

FIG. 11 shows the configuration of the tube 1 after winding onto uprights 15A. Two temples 19 according to FIG. 12 are inserted a short distance over the ends of the coil according to FIG. 11, after which the uprights 15A are turned 90° and moved in towards the middle of the coil where they can easily be removed. The configuration of the coil is then maintained by the two temples 19. Thereafter, one of the temples is moved towards the middle of the coil and a third temple is pushed over the end of the coil to replace the temple which has been moved to the centre.

In order to permanently fix the configuration of the coil, a spacer 20 may then be inserted inside the central temple 19. The spacer may consist of a strip of metal folded double, for example, which is inserted astride the temple 19 to keep the inner long sides of the coil apart.

The thickness of the convector in the embodiments described above is determined substantially by the breadth of the temples or matrices, but in order to further reduce the thickness of the convector, we have developed another embodiment which is shown in FIGS. 15 – 18.

In this case a coil according to FIG. 11 is used to start with and the coil uprights 15A are then moved towards the middle of the coil. Guide elements 19.4 (FIGS. 16 and 15) are then inserted at the ends of the coil on one long side of the coil to reinforce the coil 1. These elements may comprise three straight rods 21, for example, between which the coil turn is clamped. The coil uprights 15A can then be removed without risk of the coil losing its shape. A spacer element 19.5 (FIGS. 17 and 15) is then fitted in the middle of the coil and this may consist of two outer and one central rod 22, for example, together with two intermediate cam rods 23. The part-elements 22, 23 of the spacer 19.5 have a total thickness such that, after they are bolted together they will compress the coil 1 around its middle section to such an extent that the thickness 20 of the coil (FIG. 18) is substantially determined by the smallest radius of curvature of the coil.

As with the preceding example, the elements 19.4 and 19.5 may be provided with holes for a rod to pass through enabling the convector to be hung up against a wall.

The convector according to FIGS. 19 – 20 comprises a frame consisting of two uprights 33, 34 of steel tubing, and two horizontal cross-piece 31, 32 of wood. The lower surface of the cross piece 31 and the upper surface of the lower cross-piece 32 are cut obliquely as shown in FIG. 20. At the attachment points for the steel tubes 33, 34, the cross-pieces 31, 32 are provided with blocks 35, 36 having horizontal lower and upper surfaces, respectively. The steel tube 33 is rigidly attached to the cross-pieces 31, 32, but recesses 37 for the steel tube 34 are so dimensioned that the steel tube 34 can move slightly sideways. The tube 34 is influenced at the top and bottom by spring means. These comprise a bolt 38 extending through an aperture in cross-piece 31, 32 and through an aperture in the wall of the tube 34. At one end of the bolt, in the tube 34, is a nut 41. At the other end of the bolt is a nut 42 and a washer 40. A helical spring 39 abuts the washer 40 and the outside of the cross-piece 31, 32 and thus endeavours to pull the tube 34 away from the tube 33.

A plastic tube 43 is wound around the uprights 33, 34, the coil turns lying close together. The lowermost turn rests on the spacer rings 44, 45. The upper end 46 of the tube 43 is provided with a valve 47 and extends down along the upright 43. Both the tube ends 46, 48 extend through openings in the lower cross-piece 32. The plastic tube 43 is wound in such a way that at normal operating temperature the upright 34 has clearance in both directions in the recess 37. Thus, when the coiled tube 43 alters in length due to temperature fluctuations, it will be kept permanently taut by the springs 39.

Corrugated strips 51 are secured to the outside of the uprights 33, 34 and the tube 43 is wound so that it fits into the depressions on the corrugated strips 51. These strips are therefore of assistance during the winding process and hold up the coil turns in the finished radiator.

The convector also has a metal or wood fibre sheet 49 which is attached to the cross-pieces 31, 32 and is provided at the top and bottom with apertures 50 for air circulation. Thanks to the oblique surfaces of the cross-pieces 31, 32 the air will sweep past the whole of the flat, coiled tube 43 on the inside and on the outside. The sheet 49 contributes to improved air circulation due to its chimney effect, protects the convector from damage and also has a function esthetically. The radiator can be fitted so that the sheet 49 is parallel to the wall of the room. If desired a similar sheet may also be arranged at the back of the radiator, as well as side pieces. The board is suitably flush to the wall at the sides so that the air can only enter from below and leave at the top.

What is claimed is:

1. Method of manufacturing a convector for heating rooms comprising forming two uprights each having an upwardly extending central axis and a plurality of guide surfaces curved in the direction extending tranversely of the central axis with the guide surfaces alternating in the upward direction of the uprights, displacing adjacent guide surfaces equal distances from and in the opposite direction from the central axis, winding a tube of cross-linked polyethylene while it is still warm from the cross-linking process serially around the alternating guide surfaces for forming a helical coil, displacing the uprights out of engagement with the helically coiled tube and removing the uprights from within the coil.

2. Method according to claim 1, characterized by displacing selected long sides of the tube relative to an upwardly extending plane through the uprights while the tube is still warm after the cross-linking process and following the winding step.

3. Method according to claim 1, characterized by arranging the central axis of the uprights in substantially parallel relation.

4. Method according to claim 3, characterized by placing at least one double comb within the coil, placing single combs outside the coil on both sides opposite each double comb, pivotally mounting the combs in a jig with the journalling points permitting adjacent combs to engage with each other, turning adjacent combs in a common plane while displacing predetermined long sides of the coiled tube, and securing adjacent combs to each other.

5. Method according to claim 3, characterized in that before removing the uprights, fitting two guide elements on one long side of the coil at the ends of the coil, after which removing the uprights and then fitting a temple at the middle of the coil to clamp the coil together.

6. Method according to claim 3, characterized by before removing the uprights, pushing comb frames over the wound coil, after which removing the uprights.

7. Method according to claim 6, characterized by securing the tube coil by inserting a spacer into the coil which, together with the comb frame, forms a matrix which maintains predetermined spacing of the long sides of the coil but permits axial movement of the tube.

8. Method according to claim 6, characterized by removing the uprights by turning the uprights about an upwardly extending axis and moving them toward one another.

9. Method according to claim 6, characterized by removing the uprights by disassembling the uprights.

* * * * *

UNITED STATES PATENT OFFICE
CERTIFICATE OF CORRECTION

Patent No. 4,073,045          Dated February 14, 1978

Inventor(s) Peter Heinrich Erwin Margen et al

It is certified that error appears in the above-identified patent and that said Letters Patent are hereby corrected as shown below:

In the heading of the patent [75] & [30] should read as follows:

-- [75] Peter Heinrich Erwin Margen; Harry Evert Grimstedt, both of Nyköping; Jan Anders Bosaeus of Vagnhärad, all of Sweden.--

--[30] Foreign Application Priority Data

January 16, 1973      Sweden......... 7300590
    August 24, 1973      Sweden......... 7311565

Signed and Sealed this

Sixteenth Day of May 1978

[SEAL]

Attest:

RUTH C. MASON          LUTRELLE F. PARKER
Attesting Officer        Acting Commissioner of Patents and Trademarks